Sept. 14, 1943.  W. P. HEATH  2,329,268
LIGHT FIXTURE
Filed Nov. 12, 1941  3 Sheets-Sheet 1
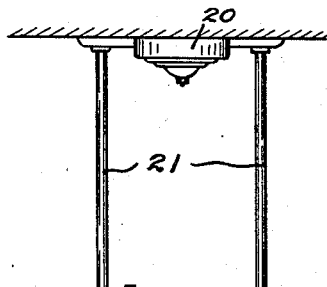
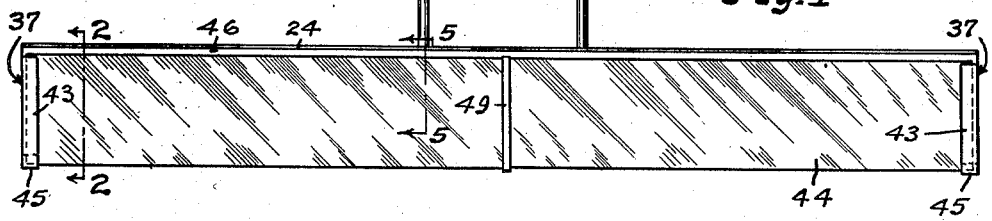
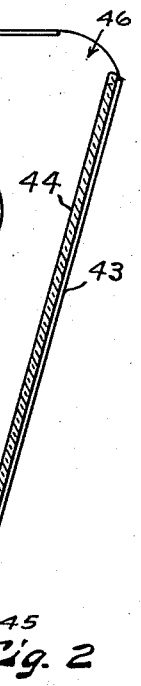
Fig. 1
Fig. 2
Fig. 3
INVENTOR
Wilfrid Paul Heath
BY
G. Wright Arnold
ATTORNEY Sept. 14, 1943. W. P. HEATH 2,329,268
LIGHT FIXTURE
Filed Nov. 12, 1941 3 Sheets-Sheet 2

INVENTOR
Wilfrid Paul Heath
BY
ATTORNEY

Sept. 14, 1943.　　　　W. P. HEATH　　　　2,329,268
LIGHT FIXTURE
Filed Nov. 12, 1941　　　　3 Sheets-Sheet 3
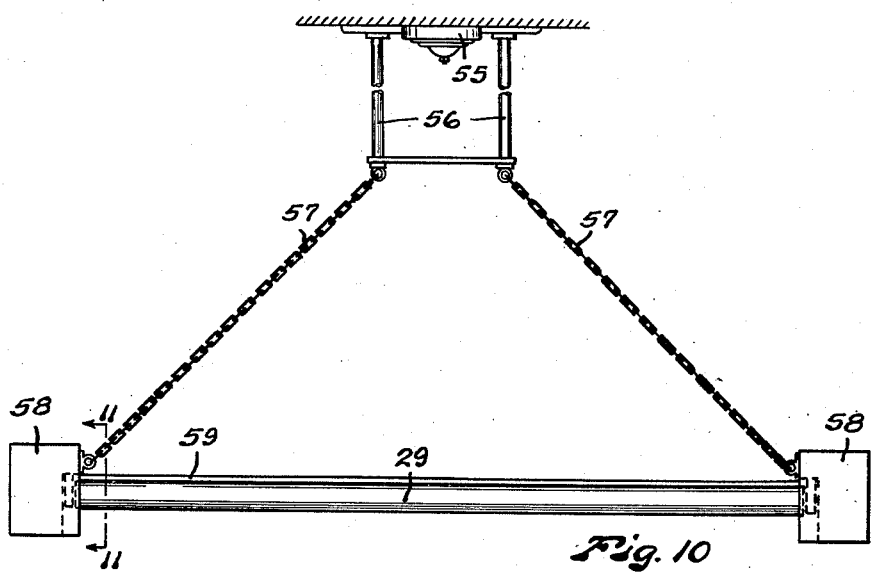
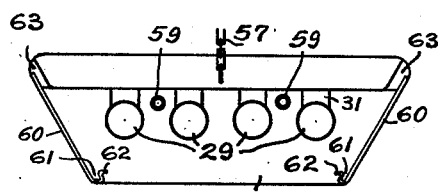
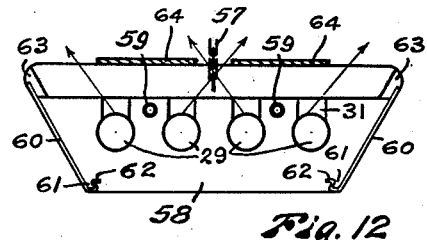
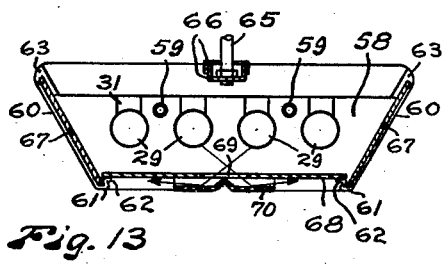
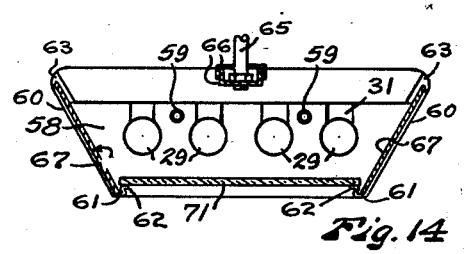
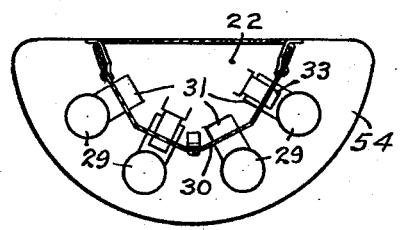
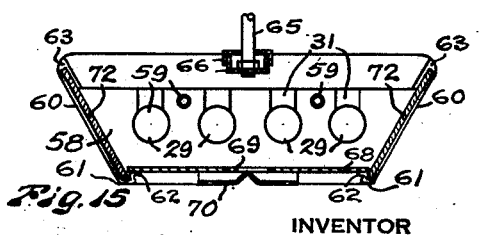
INVENTOR
Wilfrid Paul Heath
BY
G. Wright Arnold
ATTORNEY Patented Sept. 14, 1943

2,329,268

UNITED STATES PATENT OFFICE 2,329,268

LIGHT FIXTURE

Wilfrid Paul Heath, Richmond Beach, Wash.

Application November 12, 1941, Serial No. 418,653

4 Claims. (Cl. 240—78)

This invention relates to a tube light fixture. More particularly, this invention relates to a fixture having its greatest utility where fluorescent tubes are employed as the source of light and by way of illustration and not as a limitation of this invention, the invention will be described in its application to a fixture employing a fluorescent tube light or lights as the source of light.

Fluorescent tube lighting is rapidly increasing in use due to the efficiency of this type of lighting and an ever increasing demand has been created for a type of fixture particularly adapted for use with fluorescent tubes as the source of light.

It is an object of my invention to provide a type of fixture particularly adapted for use in connection with fluorescent tube lighting wherein desirable ornamentation for aesthetic purposes obtains and at the same time greatest accessibility for removal or insertion of the parts of the fixture obtains.

Due to the efficiency of fluorescent tube lighting, a concentrated source of light obtains which tends to attract flying inserts. Also if the transparent or translucent plates (a common example of which is glass and which term is used hereinafter as an example and not as a limitation) employed in the fixture become soiled in any way, the concentrated source of light tends to make manifest the soiled glass. The efficiency of any glass light fixture depends upon the freedom from dirt, dust or the like. It is, therefore, recognized that it is necessary to periodically wash the glass of the fixture. It is an object of my invention to provide a fixture so that the glass or other plate members employed may be readily inserted or removed so that they may be washed conveniently as separate pieces and under convenient circumstances rather than requiring the washer to attempt to wash the glass or plates while in position in the fixture.

It is an object of this invention to provide a fixture where the glass plates to be washed may be removed from the bottom side of the fixture without removing any attaching device, such as screws, plates or the like. It is of particular importance to provide for such removal from the bottom side so that the fixture is readily useable either as a hanging fixture or a flush fixture positioned adjacent a wall.

It is a further object of the invention to provide a device employing glass plates supported only at their end portions and thus eliminating shadows and the like which would result if dense light blocking supports were used intermediate the length of the glass plates.

It is another object of this invention to provide a fixture having readily removable and insertable plates so that glass plates may be used as the side plates or the bottom plate and also so that reflector, metal or similarly dense plates, may be used as the sides or the bottom, or a combination thereof may be used. My fixture, upon proper selection of plates, will thus readily provide diffused light through a translucent medium, or indirect lighting, or a combination of both. Also it is an object of the invention to provide a type of fixture which may be readily converted to an open light type of fixture without side plates or a bottom plate, all with a minimum changing of parts so that standard parts may be employed which are common to a various number of fixtures and mass production may be obtained.

It is also an object of the invention to provide a channel like member carrying the various electrical apparatus necessary for operation of a fluorescent tube and adapted to carry interchangeable end plates, so that end plates, to support side plates and a bottom plate, may be used or other end plates, for mere decoration purposes when open lights are used, may be employed.

It is a further object of the invention to provide a pedestal support connecting with a channel like member open at its top portion and with the cover for the channel member slidingly supported on the pedestal means, so that the pedestal may be maintained in place and the top or cover merely moved upwardly to permit access to the electrical apparatus contained within the channel means.

It is a further object of the invention to provide intermediate supporting means for a bottom plate member which may be used when the length and flexibility of the bottom plate requires and which will not in anywise interfere with the ready insertion and removal features of the side plates and bottom plate.

It is another object of the invention to provide means at the outer side portions of each end member which function not only to support the side members, but to support the bottom member and preferably to support the bottom member in such a position that the bottom member aids in supporting the side members.

It is also an object of my invention to provide end members carrying the various electrical apparatus necessary for the operation of the fluorescent tubes (generally termed in the art as the auxiliaries) and which end members are connected together by relatively small hollow rods. This provides for minimum interference with the light from the tubes and maximum efficiency in indirect lighting. It is a further object to provide in such combination, supporting means preferably in the nature of short pedestals and connecting chains. The advantage of employing short pedestals and connecting chains to the fixture permits ready adjustment of the height of the fixture which is often necessary because of varying heights of rooms.

The above mentioned general objects of my invention, together with others inherent in the same, are attained by the devices illustrated in the following drawings, the same being preferred exemplary forms of embodiment of my invention, throughout which drawings like reference numerals indicate like parts:

Figure 1 is a view in elevation of a fixture embodying my invention;

Fig. 2 is a sectional view on a larger scale taken substantially on broken line 2—2 of Fig. 1 and showing by dot and dash lines a position the bottom plate will assume while being inserted and the hand of a party so inserting the bottom plate;

Fig. 3 is a perspective view of an intermediate support employed with longer fixtures or where from the nature of the bottom plate additional support is required;

Fig. 9 is a view similar to Fig. 2, particularly showing an end plate for use in direct or open type of lighting;

Fig. 10 is a view in elevation of a modified form of the invention wherein for purposes of clearness of illustration the side plates and bottom plates have been removed;

Fig. 11 is a sectional view taken substantially on broken line 11—11 of Fig. 10;

Fig. 12 is a view similar to Fig. 11, except that reflector plates have been employed at the top, providing greater reflection of light downwardly;

Fig. 13 is a view similar to Fig. 11, except that the fixture is supported from a pedestal and a longitudinal channel connecting between end members and further the side plates and bottom plates employed are metal, as distinguished from glass;

Fig. 14 is a view similar to Fig. 13, except that the side plates are metal and the bottom plate is glass; and Fig. 15 is a view similar to Fig. 13, except that the side plates are glass and the bottom plates are metal.

Figure 6:
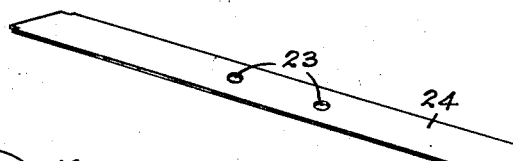
Fig. 6 is a perspective view on a reduced scale of a top plate employed in this invention.
Figure 5:
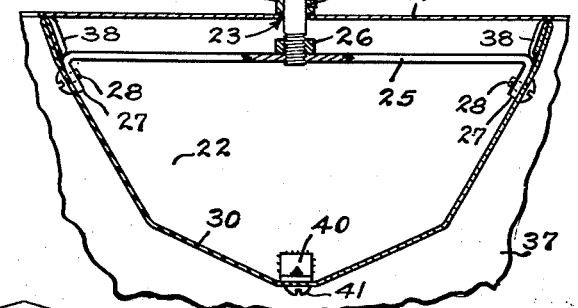
Fig. 5 is a fragmentary sectional view taken substantially on broken line 5—5 of Fig. 1.
Figure 7:
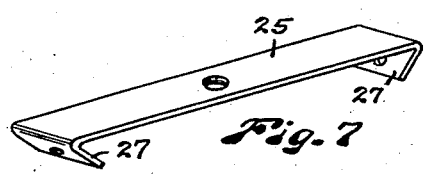
Fig. 7 is a perspective view of a supporting strap which is connected to the channel member.

Referring to Figure 1 of the drawings, a canopy member 20 is secured to a suitable support, as a ceiling, and wires connecting to a suitable source of electricity are positioned within the canopy member 20. The canopy member 20 carries hollow tubular pedestal members 21 so that wires from a source of electricity may pass through such tubes 21 and enter within a channel member 22 (see Fig. 2). The tubular members 21 pass through openings 23 in the top cover plate 24 (see also Fig. 6) and the threaded end portions of the tubular members 21 are connected with plates 25 (see Fig. 5 and also Fig. 7) and preferably nut means 26 securely fasten the tubes 21 to plates 25. As there are two tubular members 21 shown in Fig. 1, there will be two plates or straps 25, one of which is shown in Fig. 5 and in Fig. 7. The end portions of the straps are bent downwardly and inwardly to provide portions 27. These portions 27 are secured to the metallic member 30 forming the channel member 22 as by screws 28 (Fig. 5).

In order to accommodate four tubular lamps 29, the metal member 30 forming the channel member 22 is shown in the form of a portion of a hexagon. The tube lights 29 are supported by usual connectors or sockets 31 which pass through openings 32 in the metal member 30. In order to mount the usual starters 33, two openings 34 are provided at each end of the fixture in the metal member 30 (see Fig. 2 and Fig. 4).

In view of the fact that fluorescent tubes and the wiring thereof are now standard on the market I have only somewhat diagrammatically illustrated the electrical features of this device. The invention does not relate to the electrical hook-up, so the tubes, starters, sockets and the like are only indicated generally.

From the previous description it is apparent that I have supported the channel member 22 from pedestals 21 and have provided for accommodation therein of the proper electrical equipment or auxiliaries incident to tube lighting. As the channel 22 is supported by tubes 21 and plates or straps 25, the cover 24 of the channel 22 may be removed without interferring with the support of the channel 22. The holes 23 in the plate 24 (see Fig. 6) are of a size to slidably fit on tubes 21. As one form of means for holding the top cover plate 24 in place, I have shown in Fig. 5 a sleeve 35 provided with a set screw 36. Thus upon loosening of the set screw 36, the sleeve 35 may be moved upwardly on the tube 21 and in turn the plate 24 may be moved upwardly to permit access to the channel 22 and the electrical equipment therein.

Figure 4:
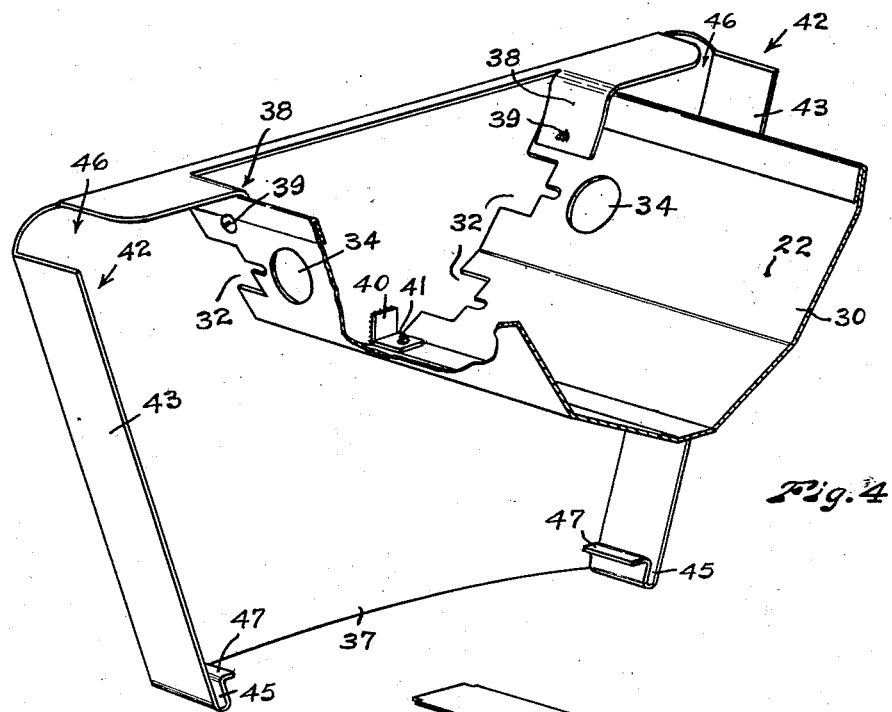
Fig. 4 is a perspective view showing an end member and a fragment of a channel member connected therewith, which channel member is employed to support and contain the various auxiliaries and electrical devices employed in the operation of my light fixture.

The end plates, generally referred to by 37 in Fig. 4, have angle portions 38 which are secured to the metal member 30 forming the channel member 22 by any suitable means, as screws 39 and such end plates 37 carry an angle bar 40 which is also suitably secured to the metal member 30 as by a screw 41. For appearance sake it is preferable that the portions 38 and 40 be within the channel member 22.

Each end plate 37 has a bar like side and bottom plate supporting means disposed on the outer side portions thereof and is numbered generally 42 in Fig. 4. Each plate supporting means 42 has a downwardly and inwardly inclined portion 43 which supports a side plate, as side plate 44 (Fig. 2) against outward movement. The length of the side plates 44 and the distance between end plates 37 is such that the side plates 44 will not move longitudinally an appreciable extent so that relatively narrow portions 43 may be employed and at the same time the side plates 44 are supported against outward movement. The curved bottom portion 45 receives therein an end portion of the bottom edge of a side plate 44 and thus the side plate is supported against downward movement. As the side plates 44 are preferably angularly positioned, by gravity they will tend to lie against the portion 43 and thus be supported against outward movement. Also the curved bottom portions 45 will support the side plates 44 against downward movement.

To insert a side plate 44, a side plate 44 is moved upwardly and at an angle until the lower edge portion thereof is above the curved bottom portion 45 and then the side plate 44 is moved angularly and downwardly until the respective end bottom edges of the side plate 44 rest within the longitudinally spaced apart curved bottom portions 45. As the angle portions 38 (see Fig. 4) are spaced from the portions 43, an opening 46 is provided through which a side plate 44 may be raised sufficiently so that the lower edge corner portions of the side plates 44 may be inserted in two longitudinally spaced curved bottom portions 45.

Inwardly projecting horizontal portions 47 of the plate supporting means 42 serve to support a bottom plate, as plate 48. The bottom plate 48 is either first removed in releasing the plates, or last inserted in assemblying the same in place. Assuming that the plates are being assembled and each of the side plates 44 has been positioned in place, then the bottom plate 48 may be positioned in place by raising the same while angularly positioned as shown by dot and dash lines in Fig. 2 and then angularly turning the bottom plate 48 until it assumes a horizontal position above the four horizontal portions 47 and permitting the same to come to rest on the horizontal portions 47.

Preferably the curved bottom portion 45 is at a lower level than the horizontal portion 47 of the plate supporting means 42 so that a bottom plate 48 will be at a level above the lower edge of a side plate 44. By providing proper width to the bottom plate 48, the bottom plate 48 will cooperate with curved portion 45 to prevent angular movement and will thus function to hold the side plates 44 in place. This feature of my invention will have its greatest utility in the event that the side plates 44 are designed to extend in a vertical plane rather than in an inclined plane as shown in Fig. 2.

From the foregoing, it will be apparent that the side and bottom plates of my fixture are supported only at the corners and longitudinal movement of such side plates and bottom plates is prevented by the longitudinally spaced end plates 37. Thus if glass plates are employed as side plates 44 and bottom plates 48, the plates are only supported at their end portions. Should the longitudinal length of the side plates 44 and bottom plate 48 be such that there will be a tendency for the bottom plate 48 to sag, then I preferably employ a support 49, shown in perspective in Fig. 3. This support 49 has a curved bottom portion 50, a horizontal shelf 51 and an upper curved portion 52. A support 49 is positioned preferably midway the length of each side plate 44 as shown in Figure 1. The upper curved portion 52 fits over the top edge of a side plate 44 and the curved portion 50 fits around the bottom edge of a side plate 44. The shelf 51 serves to support a bottom plate 48 intermediate its length and thus prevent sagging of the bottom plate 48. The support 49 may be bent around and thus secured to a side plate 44 or if sufficient accuracy obtains in the cutting of the side plate 44 and in providing the bends on the support 49, then the support 49 may be slidingly moved longitudinally of a side plate 44 until properly positioned as respects the longitudinal length of the side plate 44. The horizontal shelves 51 are in the same plane as the horizontal portion 47 so that a bottom plate 48 may be moved in place as previously described, without interference from the horizontal shelf 51, and the bottom plate 48 supported from four portions 47 and two portions 51.

By way of illustration in Figs. 1 to 7 inclusive, I have shown a plurality of tube lights 29. The number to be employed will depend upon the lighting capacity desired for a particular fixture. Preferably in fluorescent tube lighting, to lessen flickering, tubes are used in pairs or multiples thereof. However, in many instances, single tube lights are employed and as an example of my invention employing the same, I have illustrated the single lamp 29 in Fig. 8. In such instance where one tube light 29 is used as in Fig. 8, the fixture will be proportioned in accordance therewith. All of the parts of the fixture shown in Fig. 8 will be similar to the parts of the fixture shown in Figs. 1 to 7 inclusive and therefore bear similar numbers, except that preferably the channel 53 need not assume the semi-hexagon form of the channel 22 in Figs. 1 to 7 inclusive, and is, shown as a rectangular channel member.

Figure 8:
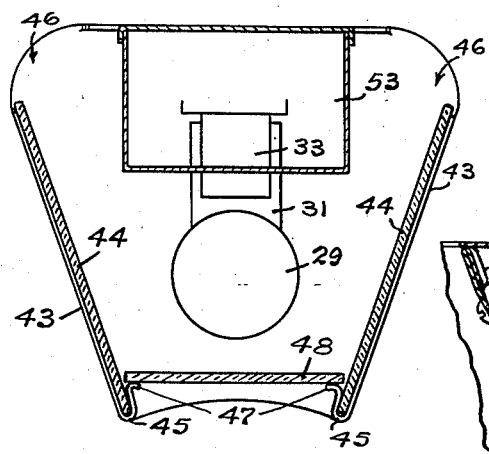
Fig. 8 is a sectional view similar to Fig. 2 showing a modified form of this invention where only one tube lamp or light, as distinguished from a plurality of tube lights or lamps, is employed.

In view of the presence of a channel member 22 in Figs. 1 to 7 inclusive or a channel member 53 in Fig. 8, preferably the fixtures shown in Figs. 1 to 8 inclusive are designed for use where the side plates 44 and bottom plates 48 are glass. In other words, the type of fixture is that which is generally termed in the art direct diffused lighting. In other words, the light is diffused by the glass plates 44 and 48.

In order to provide for greatest utility and interchange of parts, so that the fixture shown in Figs. 1 to 8 inclusive, may be used for direct lighting without diffusion of light by glass, the end plates 37 of Figs. 1 to 8 inclusive may be replaced by the end plates 54, one of which is shown in Fig. 9. This plate may be similar to the plate 37, except that the contour thereof is rounded for appearance and the plate supporting means 42 are eliminated. Thus if the user desires to convert a fixture of the type shown in Figs. 1 to 8 inclusive, to a direct lighting fixture without diffusion of light, it is only necessary to remove the end plates 37 and substitute therefor end plates 54. Likewise should a user desire to buy an obviously less expensive fixture, the same fixture, so far as channel means 22 or 53 and the operative lamp parts connected therewith are concerned, may be purchased with end plates 54 attached and the lamp will be a direct lighting lamp without diffusion of the light. Should thereafter the purchaser of such a less expensive fixture desire to convert the same to a fixture having diffused light, then the end plates 54 may be removed with the fixture hanging in place and then new end plates 37, appropriate side plates 44, and a bottom plate 48 may be installed with the fixture in the same position. By use of my invention thus standard parts obtain and the fixture is particularly designed for mass production.

Another feature of the construction shown in Figs. 1 to 9 inclusive is that the end plates may be stamped and substantial savings result. The end plate 37 may be stamped from a single sheet of material, with the exception of the angle bar 40 and a concurrent rate of economy in production obtains.

An important feature of my fixture shown in Figs. 1 to 8 inclusive is that all of the plates may be removed from the bottom side. This is of extreme importance in the cleaning of the plates 44 and 48. In the prior art fluorescent tube lamp fixtures supporting screws were employed which required, for safety sake, two men to remove the glass portions to clean the same, or else it was necessary to clean the portions in place. Cleaning plates in place is very unsatisfactory and does not provide the desired cleaning job. In my fixture the plates may be rapidly and efficiently removed for cleaning purposes and thereafter rapidly inserted and the plates then held without fear of the plates falling or dropping—all without longitudinal metal supports which would throw shadows and interfere with the operative value and beauty of the fixture.

My invention is shown in Figs. 10 to 15 inclusive with fixtures designed primarily for indirect light in whole or in part. Referring more particularly to Fig. 10, the canopy 55 will function similarly to the canopy 20 described in connection with Figs. 1 to 9 inclusive. The tubes or pedestals 56 will function similarly to the tubes 21 of the previous said figures. The chains 57 each have an electric conductor means suitably interwoven therewith with both conductors preferably following one chain or with a conductor following either chain, all in accordance with common practice. A body portion 58 is positioned at each end and is supported by chains 57. Tubular rods 59 provide longitudinal support between spaced apart body portions 58. Further, the tubes 59 serve as a conduit means for electric wires interconnecting the body portions 58. Four tube lights or lamps 29 are shown in each of Figs. 10 to 15 inclusive. In the event that plate members, that is, side and bottom, are to be used in connection with the fixture shown in Figs. 10 and 11, a portion 60, functioning in the identical manner as the portion 43 in the previous figures, is employed. Connected to the portion 60 is a curved bottom portion 61 which is similar in function to the curved body portion 45 of the previous figures. A horizontal shelf portion 62 functions similarly to the horizontal shelf portion 47 of the previous figures. Thus, in Figs. 10 and 11 side plates may be inserted by moving side plates in place similarly to the manner in which the side plates were moved in place in Figures 1 to 8 inclusive. The space or opening 46 of the previous figures, in which the upper portion of a side plate was inserted for installation purposes, is the space or opening 63 in Fig. 11. After the side plates have been inserted into position, then a bottom plate may be inserted in position and the same will rest on the horizontal shelf portions 62 similarly to the mode of operation described in connection with shelf portion 47 of the previous figures.

A further adaptation of my invention is shown in Fig. 12 where the additional feature resides in the reflector plates 64 which permits part of the light to move upwardly and pass said reflector plates 64 and said reflector plates 64 directly reflect downwardly a desired portion of the light. A portion of the light passes upwardly as indicated by the arrows in Fig. 12.

A further modification of my invention is shown in Fig. 13 where a fragment of a pedestal 65 is shown which is connected at the top to any suitable support. The lower end of the pedestal 65 is connected to a longitudinal conduit like member 66 which is preferably formed in two parts for assembling and disassembling purposes. The respective end portions of the conduit 66 are connected to the spaced apart body portions 58. Thus the conduit 66 functions as additional supporting means between the spaced apart body portions 58 and further functions as a conduit means for the reception of electrical conductors therein. The pedestal 65 and conduit 66 of Fig. 13 are merely a modification of the pedestal and chain supports 56—57 of Figs. 10 and 11. Other features in Fig. 13 relating to the type of side plates and the type of bottom plate may be employed in any of the fixtures of Figs. 10 to 15 inclusive. The pedestal 65 and conduit 66 are shown in connection with the fixtures shown in Figs. 14 and 15.

In Fig. 13 I have also shown metal side plates 67 and have also shown such metal side plates in Fig. 14. In Fig. 15 I have shown a metal bottom plate which comprises a main bottom plate 68, the main bottom plate 68 is provided with a central opening 69 and an auxiliary bottom 70 connected with and positioned in spaced relation relative to said main bottom 68, thus permitting light to pass as indicated by arrows in Fig. 13.

In Fig. 14 I have shown metal sides 67 and a glass bottom 71.

In Fig. 15 I have shown glass side plates 72 and metal bottom 68—69—70.

Obviously, glass or metal side plates or glass or metal bottom plates and metal plates having the desired reflector characteristics, may be employed in various combinations in the fixtures shown in Figs. 10 to 15 inclusive. Also the upper reflector plates 64 shown in Fig. 12 may be used in any of the light fixtures shown in Figs. 10 to 15 inclusive.

Throughout the various illustrations of fixtures embodying my invention, the side plates and the bottom plate are all held in place by the same means and it is obvious that the type of side plates or bottom plates may take many forms and still be within the scope of my invention. It is further obvious that my invention is applicable to fixtures whether the same are for direct lighting, direct lighting with diffusion, or indirect lighting, or a combination of two or more such types of lighting.

Obviously, changes may be made in the forms, dimensions and arrangement of the parts of my invention, without departing from the principle thereof, the above setting forth only preferred forms of embodiment.

I claim:

1. A trough like shaped fixture comprising two spaced apart secured together end members; removable bottom and side plates; and bar like side and bottom plate supporting means disposed on the outer side portions of each end member, each said bar like means comprising a downwardly and inwardly inclined portion supporting a side plate at an end portion and against outward movement, a curved bottom portion of a size to receive therein the end portion of the bottom edge of a side plate and supporting the side plate against downward movement, and an inwardly projecting horizontal portion supporting a bottom plate, whereby the side plates may be moved into position from below the fixture by moving the same upwardly, thence angularly, and thence downwardly until an edge portion thereof fits into the curved bottom portion of the plate supporting means and the bottom plate may be moved into place from below the fixture by moving the same upwardly while in an angular position and then angularly turning the bottom plate to a horizontal position and permitting the same to rest upon and be supported by said inwardly projecting horizontal portion of the plate supporting means.

2. A trough like shaped fixture comprising two spaced apart secured together end members; removable bottom and side plates; and bar like side and bottom plate supporting means disposed on the outer side portions of each end member, each said bar like means comprising a downwardly and inwardly inclined portion supporting a side plate at an end portion and against outward movement, a curved bottom portion of a size to receive therein the end portion of the bottom edge of a side plate and supporting the side plate against downward movement, and an inwardly projecting horizontal portion supporting a bottom plate and positioned at a higher level than said curved bottom portion and permitting the side edges of the bottom plate to further function to secure the side plates in position, whereby the side plates may be moved into position from below the fixture by moving the same upwardly, thence angularly, and thence downwardly until an edge portion thereof fits into the curved bottom portion of the plate supporting means and the bottom plate may be moved into place from below the fixture by moving the same upwardly while in an angular position and then angularly turning the bottom plate to a horizontal position and permitting the same to rest upon and be supported by said inwardly projecting horizontal portion of the plate supporting means.

3. A fluorescent tube light fixture comprising a substantially U shaped body member open at the top and adapted to receive therein fluorescent tube light electric operating equipment; an end member carried by and positioned at each end portion of said body member; side plates and a bottom plate releasably carried by said end members; bar like side and bottom plate supporting means disposed on the outer side portions of each end member, each said bar like means comprising a downwardly and inwardly inclined portion supporting a side plate at an end portion and against outward movement, a curved bottom portion of a size to receive therein the end portion of the bottom edge of a side plate and supporting the side plate against downward movement, and an inwardly projecting horizontal portion supporting a bottom plate, whereby the side plates may be moved into position from below the fixture by moving the same upwardly, thence angularly, and thence downwardly until an edge portion thereof fits into the curved bottom portion of the plate supporting means and the bottom plate may be moved into place from below the fixture by moving the same upwardly while in an angular position and then angularly turning the bottom plate to a horizontal position and permitting the same to rest upon and be supported by said inwardly projecting horizontal portion of the plate supporting means; a fixture supporting depending pedestal connected to said body member; and a cover plate means for said body member slidable on said pedestal and movable into and out of closing position as respects the top of said body member, whereby said cover plate means may be moved out of closing position without moving said pedestal.

4. In a light fixture, longitudinally spaced end members; longitudinal connecting means between said end members; side plates and a bottom plate of a character tending to sag supported by said end members; and an intermediate supporting member for said bottom plate carried by each said side plates and each comprising a portion extending transverse of a side member, curved portions engaging the top and bottom edges of a side plate, and a horizontal inwardly projecting shelf portion for supporting a bottom plate intermediate its length and supporting it against sagging.

WILFRID PAUL HEATH.